United States Patent [19]
Otsuzuki et al.

[11] Patent Number: 5,891,962
[45] Date of Patent: *Apr. 6, 1999

[54] TRANSPARENT, RUBBER-MODIFIED STYRENE RESIN AND PRODUCTION PROCESS THEREOF

[75] Inventors: Shiro Otsuzuki; Mune Iwamoto; Akihiko Nakajima; Masato Takaku; Hisao Morita; Koji Kawano, all of Takaishi, Japan

[73] Assignee: Mitsui Chemicals, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 527,718

[22] Filed: Sep. 13, 1995

[30] Foreign Application Priority Data

Sep. 20, 1994 [JP] Japan .................................. 6-224590
Mar. 2, 1995 [JP] Japan .................................. 7-042722

[51] Int. Cl.$^6$ ........................... C08L 33/10; C08F 271/06
[52] U.S. Cl. ............................................ 525/316; 525/98
[58] Field of Search ........................................ 525/316, 98

[56] References Cited

U.S. PATENT DOCUMENTS

| | | | |
|---|---|---|---|
| 2,941,977 | 6/1960 | Roche et al. | 525/198 |
| 3,267,178 | 8/1966 | Lee | 525/243 |
| 4,080,406 | 3/1978 | Kelsey | 525/310 |
| 4,097,555 | 6/1978 | Moran | 525/84 |
| 4,100,228 | 7/1978 | Dennis et al. | 525/244 |
| 4,230,833 | 10/1980 | Purvis | 525/260 |
| 4,308,354 | 12/1981 | Jung et al. | 525/84 |
| 4,386,190 | 5/1983 | Bailey | 525/93 |
| 4,598,123 | 7/1986 | Cutter | 525/84 |
| 4,951,656 | 8/1990 | Gorka et al. | 128/90 |

FOREIGN PATENT DOCUMENTS

| | | |
|---|---|---|
| 0 080 072 | 6/1983 | European Pat. Off. . |
| 0 307 818 | 3/1989 | European Pat. Off. . |
| 1526993 | 9/1968 | France . |
| SHO55-25215 | 7/1980 | Japan . |
| SHO57-195139 | 11/1982 | Japan . |
| SHO62-43450 | 9/1987 | Japan . |
| SHO63-31488 | 6/1988 | Japan . |
| HEI4-180907 | 6/1992 | Japan . |
| HEI4-224848 | 8/1992 | Japan . |
| HEI4-224849 | 8/1992 | Japan . |
| HEI4-351649 | 12/1992 | Japan . |
| HEI5-54484 | 8/1993 | Japan . |

OTHER PUBLICATIONS

*Polymer Handbook*, "Refractive Indices of Polymers", James C. Seferis, Third Edition, pp. VI/451–461 (1989).

*Primary Examiner*—Mark L. Warzel
*Attorney, Agent, or Firm*—Burns, Doane, Swecker & Mathis, L.L.P.

[57] ABSTRACT

A transparent, rubber-modified styrene resin comprises 70 to 96 parts by weight of a copolymer formed of 20 to 70 wt. % of styrene monomer units and 30 to 80 wt. % of alkyl (meth)acrylate monomer units and 4 to 30 parts by weight of a rubbery polymer. The rubbery polymer is dispersed in the copolymer as particles having an average particle size of 0.1 to 2.0 μm. At least 70 wt. % of the rubbery polymer is a styrene-butadiene block copolymer which is formed of 5 to 50 wt. % of styrene units and 50 to 95 wt. % of butadiene units, has a viscosity in a range of 3 to 60 cps when measured as a 5 wt. % styrene solution at 25° C. and possesses a ratio (Mw/Mn) of a weight average molecular weight (Mw) to a number average molecular weight (Mn) in a range of 1.0 to 1.8. The copolymer and the rubbery polymer have substantially the same refractive index. Also disclosed is a production process of the transparent, rubber-modified styrene resin, which comprises polymerizing a styrene monomer and an alkyl (meth)acrylate to a high degree of polymerized conversion in the presence of the rubbery polymer so that the rubbery polymer is formed into particles while allowing the copolymer to occur with substantially the same refractive index as the rubbery polymer.

15 Claims, 1 Drawing Sheet

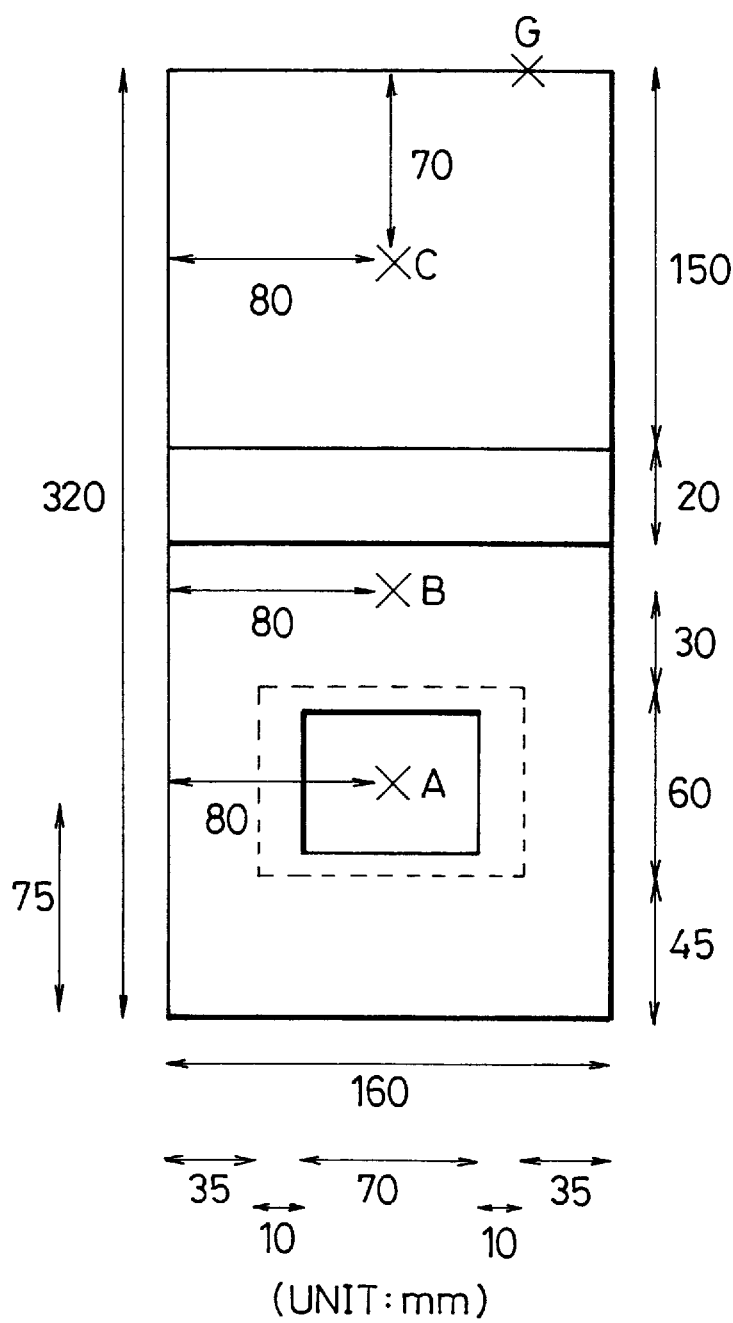
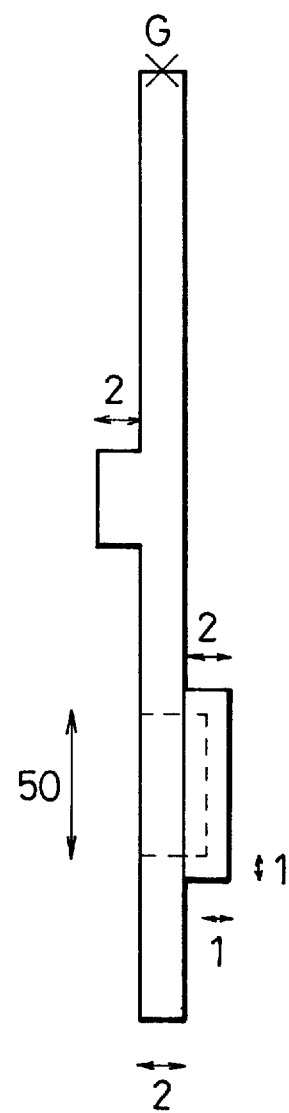

TRANSPARENT, RUBBER-MODIFIED STYRENE RESIN AND PRODUCTION PROCESS THEREOF

BACKGROUND OF THE INVENTION (a) Field of the Invention

This invention relates to a rubber-modified styrene resin having excellent transparency and good impact resistance and to a production process thereof. More specifically, this invention is concerned with a transparent, rubber-modified styrene resin obtained by polymerizing a styrene monomer and an alkyl (meth)acrylate to a high degree of polymerized conversion in the presence of a rubbery polymer having a specific structure in accordance with an extremely simple polymerization process so that the rubbery polymer is formed into particles while allowing a styrene copolymer having substantially the same refractive index as the rubbery polymer to occur, and with the production process for the transparent, rubber-modified styrene resin.

(b) Description of the Related Art

Styrene resins are used for a wide variety of applications, led by home electric and electronic appliances, office automation equipments and packaging materials, for their characteristic properties of excellent transparency, stiffness and moldability. Use of a styrene resin alone however cannot provide sufficient impact resistance so that, for applications where impact resistance is required, the styrene resin is generally used after modifying it with a rubbery polymer. This rubber-modified styrene resin has been significantly improved in impact resistance compare with the unmodified resin but is no longer equipped with the inherent characteristic property of the styrene resin, that is, transparency. This is attributed to the difference in refractive index between the styrene resin and the rubbery polymer.

According to J. Brandrup and E. H. Immergut, *Polymer Handbook*, 3rd ed., VI, 451–461, John Wiley & Sons, New York, N.Y. (1989), the refractive index of polystyrene is 1.59 to 1.592 while that of polybutadiene is 1.516 to 1.520. In general, a styrene resin has a higher refractive index than a rubbery polymer.

However, there is still a strong market demand for the transparency of styrene resins. It is therefore an extremely important theme from the industrial standpoint to develop a transparent, rubber-modified styrene resin, in other words, to retain the transparency of a styrene resin while imparting impact resistance to it.

Upon using a transparent, rubber-modified styrene resin especially in the field of packaging materials, the resin is first formed into a sheet or the like, followed by secondary processing into a desired shape in accordance with vacuum forming or pressure forming. This secondary processing however causes the transparency of the resin to be lowered. There is accordingly a great market demand not only for the transparency of the resin itself but also for the retention of transparency upon its forming or shaping.

Reflecting ever-increasing concern for environmental problems in recent years, there is an increasing desire toward resins which permit easy material recycling. Development of a resin permitting easy material recycling is also important from the viewpoint of productivity because, when a resin sheet is subjected to secondary processing to form, for example, blister cases or the like, higher productivity can be achieved by using the resin, which still remains after punching out the processed products, again as a molding or otherwise forming material. To recycle a resin as a natural resource, the once-processed resin is ground, is heated, molten and kneaded by an extruder or the like, and is then used again as a material. A conventional transparent, rubber-modified styrene is accompanied by the problems that when repeatedly heated, the color of the resin changes and the impact resistance becomes lower. For the development of a transparent, rubber-modified styrene resin, it is accordingly an important theme now to prevent deterioration of its physical properties, especially, a change in its hue and a reduction in its impact resistance upon heating.

Conventional transparent, rubber-modified styrene resins are produced, for example, by blending a polystyrene as a styrene resin with a styrene-butadiene block copolymer as a rubbery polymer as disclosed in Japanese Patent Laid-Open No. 195139/1982. However, products obtained by such blending however cannot successfully meet the market demand in view of the problems to be described next. Namely, if the blending method or condition for the polystyrene and the styrene-butadiene block copolymer is changed (for example, the type of an extruder in which the blending is to be performed is changed from the single screw type to the twin screw type even when the same materials are employed, or the extrusion temperature, residence time, rotational speed and the like are changed although the same materials and the same extruder are used), the kneaded state, the thermal deterioration and/or the degree of discoloration of the two materials change, resulting in changes in both transparency and impact resistance. This leads to a problem in reproducibility. Depending on the extrusion conditions, the rubbery polymer may be gelled, leading to serious problems from the standpoint of molding and/or processing such as occurrence of fish eyes. Moreover, their refractive indices are basically different so that there is naturally a limit to the transparency of the resulting product.

From the viewpoint of material recycling, the deterioration of the resin significantly proceeds to lower the impact resistance as the heat history becomes longer. This is certainly not preferred. To improve the transparency, it has also been proposed to make the content of styrene higher in the styrene-butadiene block copolymer to be blended. The copolymer however is imparted with properties similar to polystyrene so that physical properties, especially, impact resistance of the product is extremely lowered. This approach is therefore not preferred.

With a view to overcoming the above-described problems, Japanese Patent Laid-Open No. 351649/1992, for example, discloses a process in which a styrene copolymer, which has been obtained by copolymerizing one or more alkyl acrylates or alkyl methacrylates with a styrene monomer and has a refractive index similar to a rubbery polymer, is blended with the rubbery polymer.

The important point of the production of the copolymer having a similar refractive index as the rubbery polymer resides in controlling the ratio of styrene monomer structural units to alkyl (meth)acrylate structural units, said former and latter structural units making up the styrene copolymer, in conformity with the molecular structure of the rubbery polymer so employed.

Assuming, for example, that the rubbery polymer is a styrene-butadiene copolymer, the styrene-butadiene copolymer is required to satisfy the following formulae (1), (2) and (3):

$$|n_1-n_2| \leq 0.01 \tag{1}$$

where $$n_1 = 0.01591 \times X + 0.01518 \times (100-X) \tag{2}$$

$$n_2 = n_s \times Y \div 100 + n_M \times (100-Y) \div 100 \tag{3},$$

X: the mole % of styrene structural units contained in the rubbery polymer,

Y: the mole % of styrene monomer structural units contained in the styrene copolymer, $n_s$: the refractive index of the structural unit of the styrene monomer, and $n_M$: the refractive index of alkyl (meth)acrylate structural units.

The values of $n_s$ and $n_M$ in the formula (3) can be found in a publication such as J. Brandrup and E. H. Immergut, *Polymer Handbook* 3rd ed., VI, 451–461, John Wiley & Sons, New York, N.Y. (1989) on the basis of the types of the monomers employed.

It is therefore possible to determine the ratio of the styrene monomer structural units to the alkyl (meth)acrylate structural units in the styrene copolymer in accordance with the formulae (1), (2) and (3).

The above process can improve the transparency to some extent because the styrene copolymer and the rubbery polymer have substantially the same refractive index. With respect to the impact resistance, especially, the impact resistance after repeated heating, the problem has not been improved at all because the process relies upon blending. Namely, the resulting blend has low impact resistance and moreover, its impact resistance considerably varies depending on the degree of kneading and is progressively lowered as it is repeatedly heated. The blend is therefore not preferred.

A process has hence been proposed to produce a transparent, rubber-modified styrene resin by subjecting a styrene monomer and an alkyl (meth)acrylate at a particular ratio to emulsion polymerization in the presence of a rubbery polymer latex as disclosed, for example, in Japanese Patent Publication No. 43450/1987.

Further, as disclosed in Japanese Patent Laid-Open No. 224848/1992, it has also been proposed to produce a transparent, rubber-modified styrene resin by blending in an extruder or the like a graft polymer—which has been obtained by polymerizing a styrene monomer and an alkyl (meth)acrylate with a rubbery polymer obtained by emulsion polymerization—with a copolymer of a styrene monomer and an alkyl (methacrylate) produced by bulk or solution polymerization. According to these processes, the impact resistance has been far improved over the blending process, because the rubbery polymer exists as stable particles adequately crosslinked in advance with divinylbenzene or the like and a portion of the copolymer of the styrene monomer and the alkyl (meth)acrylate formed by the polymerization has been grafted on the rubbery polymer. Because of the production process, however, an amphiphatic low-molecular compound called an "emulsifier" has to be added to emulsify and disperse the hydrophobic monomers in water upon polymerization and moreover, a coagulant such as calcium chloride has to be added subsequent to the completion of the polymerization in order to separate the resultant polymer latex from water. The resin so produced therefore contains impurities such as the emulsifier and the coagulant so that the resin has extremely low transparency due to these impurities. Further, upon molding such resins, impurities remain on a mold. The impurities deposited on the mold are discolored as molding is repeated. Eventually, the impurities are transferred onto the resin, resulting in molded products having poor external appearance. In addition, when a vent portion of the mold is clogged by such impurities, gas is not released from the mold. Therefore the mold is no longer uniformly filled with the resin so that a short shot takes place. To avoid such poor external appearance or short shot, the mold is usually washed periodically. Deposit of such impurities in a large quantity hence requires frequent washing, resulting in a reduction in productivity. To reduce such impurities, it may be contemplated to repeatedly and thoroughly wash the resin in the coagulation step of the resin production process. This measure is however not preferred for a higher production cost, because it requires additional production equipments, a great deal of water for washing and tremendous labor for the treatment of waste water.

To eliminate impurities such as an emulsifier contained in a resin, it has been proposed to change polymerization from emulsion polymerization to bulk or solution polymerization.

Japanese Patent Publication No. 25215/1980 discloses to produce a transparent, rubber-modified styrene resin by dissolving a rubbery polymer in a monomer composed of methyl methacrylate and styrene, and then subjecting the resulting solution to batchwise bulk polymerization. The rubbery polymer is a substance which has ability to react with radicals and is rubbery at room temperature. Usable examples of the rubbery polymer include polybutadiene, butadiene-styrene random copolymers, and butadiene-styrene block copolymers. This process does not use an emulsifier or the like which poses a problem in the production of a resin by emulsion polymerization or bulk-suspension polymerization, so that the above-described impurity-related problem does not arise. According to the specification as published, however, the resulting rubbery polymer has a particle size as large as 4 to 7 $\mu$m so that the molded or otherwise formed product has rough surfaces. Scattering of light therefore takes place, resulting in low transparency. In addition, the transparency is also lowered by molding or processing. The resin is also accompanied by the drawbacks that compared with the impact resistance and hue of the resin before heating, its impact resistance and hue after heating are significantly lower and substantially different.

To improve a reduction in transparency due to a distribution in the copolymerized composition, Japanese Patent Publication No. 31488/1988 (corresponding to U.S. Pat. No. 4,230,833) discloses production of a transparent, rubber-modified styrene resin by continuous-flow bulk polymerization. Described specifically, a polymerization raw material formed by dissolving a rubbery polymer in a monomer composed principally of methyl methacrylate and styrene is continuously supplied to a single reaction tank. While continuously stirring the solution and controlling the temperature, pressure and average residence time at 161° C. to 195° C., 100 to 175 psig and less than 90 minutes, respectively, polymerization is conducted to produce a transparent, rubber-modified styrene resin. Usable examples of the rubbery polymer include polybutadiene, butadiene-styrene copolymers, butadiene-acrylonitrile copolymers, ethylene-propylene-diene copolymers, and isoprene polymer and copolymers.

Since this process makes use of continuous-flow bulk polymerization and the polymerization is conducted in the single reaction tank, the copolymer so formed has a narrow composition distribution. This process is therefore considered to be suited for providing a resin with transparency. Production of a resin on the basis of this process however requires extremely precise control of polymerization conditions such as polymerization temperature, reaction pressure and average residence time. Further, the polymerization reaction tends to run away as the polymerization temperature is as high as 161° C. to 195° C. It is therefore difficult to maintain the polymerization conditions within the prescribed ranges for a long period of time. To practice this process as an actual plant, there is accordingly a serious problem in the operation stability of the plant, hence, in the ability to stably produce a resin having high transparency and impact resistance. Moreover, a great deal of labor is needed for the control of the polymerization conditions so that the production cost is high. In addition, the high polymerization temperature results in the formation of low m.w. copolymers in large quantities. Like impurities contained in a resin produced by the above-described emulsion or suspension polymerization, these low m.w. copolymers cause a reduction in the transparency of the resin and also induce discoloration or a short shot upon molding or processing.

As a production process of a transparent, rubber-modified styrene resin by another continuous-flow bulk polymerization, Japanese Patent Laid-Open No. 180907/1992, for example, discloses to use a styrene-butadiene copolymerized rubber containing 1,2-vinyl bonds in a proportion of 14 to 25% based on unsaturated bonds derived from butadiene and to conduct polymerization under static mixing of a polymerization mixture in an apparatus with a built-in tubular reactor in which plural mixing elements having no movable parts are internally fixed. This process features easy controllability of the size of rubber particles. However, the tubular reactor which makes up a recirculation line and a non-recirculation line for the polymerization mixture has lower mixing ability for the polymerization mixture compared with a complete-mixing reaction tank. The composition of the polymerization mixture therefore becomes uneven, resulting in the formation of a copolymer of a styrene monomer and a (meth)acrylate ester with a broader composition distribution. On the other hand, use of plural reactors requires a great deal of labor for the control of the copolymer composition because the mixing ratio of the unreacted styrene monomer to the unreacted (meth) acrylate ester varies from one reactor to another. Accordingly, the resulting styrene resin is not significantly improved in transparency compared with that produced by a batchwise reaction. Further, any attempt to increase the concentration of the rubbery polymer in the resin requires to substantially lower the degree of polymerized conversion in each reactor depending on the number of reactors, thereby posing problems on the controllability of the polymerization and the productivity at that time.

As a production process of a transparent, rubber-modified styrene resin by further continuous-flow bulk polymerization, Japanese Patent Publication No. 54484/1993, for example, discloses a process for the production of a transparent, rubber-modified styrene resin, which features mixing a first flow—which has been obtained by polymerizing a solution of a rubbery polymer, a styrene monomer, an alkyl (meth)acrylate and a solvent and terminating the polymerization at such a degree not exceeding a degree of polymerized conversion beyond which the rubbery polymer is converted into particles—with a second flow of a solution of the styrene monomer, the alkyl (meth)acrylate and the solvent, the latter solution being in the course of polymerization, and polymerizing the thus-obtained mixture to form the rubbery polymer into particles. As the rubbery polymer, one or more rubbery polymers selected from polybutadiene and butadiene-styrene copolymers can be used. According to this process, polymerization is conducted to an appropriate degree in each of plural reactors. Since the mixing ratio of the unreacted styrene monomer to the unreacted alkyl (meth)acrylate varies from one reactor to another, the resulting copolymer of the styrene monomer and the alkyl (meth)acrylate however tends to have a broad composition distribution. There is accordingly a problem in that strict control of polymerization reactions is needed for the assurance of transparency. Further, nothing is taken into consideration for the maintenance of hue and impact resistance after heated.

Japanese Patent Laid-Open No. 145443/1994 discloses a styrene resin composition which has been obtained by blending a rubber-modified styrene polymer with a styrene-butadiene block copolymer and a terpene resin and which undergoes less reduction in transparency upon molding or processing, especially upon secondary processing. As the styrene-butadiene block copolymer and the terpene resin are added in this process, the production cost of the resin composition is high and no improvement has been made for the variation in hue after heated. In addition, the impact resistance progressively lowers as the resin composition is repeatedly heating. This process is therefore not preferred.

To obtain a transparent, rubber-modified styrene resin having high impact resistance, the conventional art is recognized, as described above, to have changed the production process from emulsion polymerization or bulk-suspension polymerization to batchwise bulk or solution polymerization or continuous-flow bulk or solution polymerization and also to have investigated additives. However, neither a rubber-modified styrene resin composition achieved both possession of transparency and impact resistance and prevention of a reduction in transparency upon molding or processing and a change in hue and a reduction in impact resistance even when heated nor a production process therefor has been developed yet.

SUMMARY OF THE INVENTION

An object of the present invention is to provide a transparent, rubber-modified styrene resin by excellent continuous-flow bulk or solution polymerization and also a production process thereof, namely, a transparent, rubber-modified styrene resin by continuous-flow bulk or solution polymerization, which permits both control of the composition of the copolymer between a styrene monomer and an alkyl (meth)acrylate and control of the particle size of a rubbery polymer and has high productivity, and a production process thereof.

The present inventors have proceeded with an extensive investigation to achieve the above object, leading to the completion of the present invention.

In one aspect of the present invention, there is thus provided a transparent, rubber-modified styrene resin comprising:

(1) 70 to 96 parts by weight of a copolymer (A) formed of 20 to 70 wt. % of styrene monomer units and 30 to 80 wt. % of alkyl (meth)acrylate monomer units, and (2) 4 to 30 parts by weight of a rubbery polymer (B), said rubbery polymer being dispersed in said copolymer (A) as particles having an average particle size of 0.1 to 2.0 $\mu$m, at least 70 wt. % of said rubbery polymer being a styrene-butadiene block copolymer (B1) which is formed of 5 to 50 wt. % of styrene units and 50 to 95 wt. % of butadiene units, has a viscosity in a range of 3 to 60 cps when measured as a 5 wt. % styrene solution at 25° C. and possesses a ratio (Mw/Mn) of a weight average molecular weight (Mw) to a number average molecular weight (Mn) in a range of 1.0 to 1.8, wherein said copolymer (A) and said rubbery polymer (B) have substantially the same refractive index.

In another aspect of the present invention, there is also provided a process for the production of a transparent, rubber-modified styrene resin, which comprises:

continuously charging into a polymerizer polymerization raw materials composed primarily of (B) a rubbery polymer, a-styrene monomer and an alkyl (meth) acrylate, said rubbery polymer (B) comprising at least 70 wt. % of (B-1) a rubbery polymer which is a styrene-butadiene block copolymer formed of 5 to 50 wt. % of styrene units and 50 to 95 wt. % of butadiene units, has a viscosity of 3 to 60 cps when measured as a 5 wt. % styrene solution at 25° C. and possesses a ratio (Mw/Mn) of a weight average molecular weight (MW) to a number average molecular weight (Mn) in a range of 1.0 to 1.8;

polymerizing the raw materials at a polymerization temperature of 80° to 160° C. under continuous stirring of the resulting polymerization mixture to form (A) a copolymer of the styrene monomer and the alkyl (meth) acrylate having a refractive index substantially the same as the rubbery polymer (B), and under the condition that the solid content of the polymerization mixture is not higher than 60 wt. %, causing the copolymer (A) and the rubbery polymer (B) to transform into a continuous phase and a dispersed phase, respectively, so that the rubbery polymer (B) is formed into dispersed particles having an average particle size of 0.2 to 2.0 μm; and feeding the polymerization mixture into a volatile elimination unit to eliminate any unreacted monomers from the polymerization mixture.

BRIEF DESCRIPTION OF THE DRAWINGS

The drawings show a test specimen employed for the evaluation of the practical impact strength, in which FIG. 1 is a plan view and FIG. 2 is a cross-sectional view.

DESCRIPTION OF THE PREFERRED EMBODIMENTS

The production process according to the present invention will hereinafter be described in detail.

A characteristic feature of the present invention resides in the use of the rubbery polymer having the particular molecular structure.

According to the present invention, the styrene-butadiene copolymer (B1)—which is a block copolymer formed of 5 to 50 wt. % of styrene units and 50 to 95 wt. % of butadiene units, has a viscosity in the range of 3 to 60 cps when measured as a 5 wt. % styrene solution at 25° C. and possesses a ratio (Mw/Mn) of the weight average molecular weight (Mw) to the number average molecular weight (Mn) in the range of 1.0 to 1.8—is used in an amount of 70 wt. % or more or preferably 85 wt% or more based on the total amount of the rubbery polymer (B) or most preferably, is used singly.

Although no particular limitation is imposed on a rubbery polymer which is contained in the rubbery polymer (B) and is other than the above-described styrene-butadiene copolymer (B1), polybutadiene or a styrene-butadiene copolymer produced by solution polymerization is preferred. They can be used either singly or in combination. Use of the styrene-butadiene copolymer (B1) in an amount smaller than 70 wt. % of the rubbery polymer (B) is not preferred because stable formation of the rubbery polymer into particles is not feasible.

The viscosity of the styrene-butadiene copolymer (B1) useful in the practice of the present invention when measured as a 5 wt. % styrene solution at 25° C. is in the range of 3 to 60 cps. A solution viscosity lower than 3 cps is not preferred since the resulting resin has lower impact resistance. A solution viscosity higher than 60 cps is not preferred either because the resulting rubbery polymer has an unduly large particle size, leading to a resin with reduced transparency. In particular, a resin obtained using a styrene-butadiene copolymer (B1) having a solution viscosity in a range of 3 to 30 cps has excellent transparency. A styrene-butadiene copolymer (B1) whose solution viscosity is in a range of 10 to 60 cps forms particles having excellent impact-absorbing ability. A resin, which has been obtained using a styrene-butadiene copolymer (B1) having a solution viscosity in a range of 3 to 40 cps, preferably 7 to 30 cps, especially 7 to 20 cps, is excellent in the balance between transparency and impact resistance. Further, a resin obtained using a styrene-butadiene copolymer (B1) whose solution viscosity is in a range of 3 to 25 cps undergoes a smaller change in hue when heated and a resin obtained using a styrene-butadiene copolymer (B1) whose solution viscosity is in a range of 10 to 40 cps undergoes a smaller reduction in impact resistance. These resins are therefore preferred.

Evaluating the styrene-butadiene copolymer (B1) on the basis of the ratio (Mw/Mn) of its weight average molecular weight (Mw) to its number average molecular weight (Mn), a styrene-butadiene copolymer (B1) whose Mw/Mn is in the range of 1.0 to 1.8, preferably in a range of 1.0 to 1.5 is excellent in the controllability of the size of its particles, especially for the formation of small particles under high polymerized conversion conditions. A resin, which has been obtained using a styrene-butadiene copolymer (B1) whose Mw/Mn is in a range of 1.0 to 1.3, has particularly high transparency. Use of a styrene-butadiene copolymer (B1) whose Mw/Mn is in a range of 1.3 to 1.8, preferably 1.3 to 1.6 results in rubbery polymer particles having a broad particle size distribution so that the resin so obtained has high impact resistance. A styrene-butadiene copolymer (B1) whose Mw/Mn is in a range of 1.1 to 1.6 is excellent in both the controllability of particle size and the impact resistance of the resulting resin. Incidentally, a styrene-butadiene block copolymer is usually produced by living polymerization so that its molecular weight distribution is narrow in general. When the viscosity of the 5 wt. % styrene solution at 25° C. is lowered to 3 to 60 cps, especially 3 to 40 cps or so, a mass of a styrene-butadiene copolymer (B1) so produced undergoes a large deformation called "cold flow" during storage or transportation at normal temperature. Such a styrene-butadiene copolymer (B1) is therefore difficult to handle and is not considered to be appropriate for industrial applications. To prevent a styrene-butadiene copolymer (B1) of a low solution viscosity from undergoing a cold flow, the problem is overcome in many instances by broadening the molecular weight distribution by improving the catalyst system, controlling the polymerization velocity, dividing the polymerization step, or adding a coupling agent such as a tin compound or a silicon compound. Incidentally, the Mw/Mn of B1 cannot become smaller than 1.0 theoretically.

When Mw/Mn is greater than 1.8, on the other hand, the resulting particles has an unduly large size if the degree of polymerized conversion upon formation of the rubbery polymer into particles is high. Moreover, the particle size considerably varies even by a slightest change in the degree of polymerized conversion, thereby making it difficult to stably form particles of the same size. Such a large Mw/Mn ratio is therefore not preferred.

The terms "weight average molecular weight (Mw)" and "number average molecular weight (Mn)" as used herein are those measured using a gel permeation chromatograph, and are values converted in comparison with a standard polystyrene sample whose molecular weight is already known.

In the present invention, the styrene-butadiene copolymer (B1) can be used without any particular limitation on the type of unsaturated bonds contained in the copolymer (B1) and derived from butadiene. For example, even when a styrene-butadiene copolymer in which 1,2-vinyl bonds account for 20 wt. % of whole unsaturated bonds derived from butadiene is used, a resin excellent in both transparency and impact resistance can still be obtained. However, a styrene-butadiene copolymer containing 1,2-vinyl bonds in a range of 1.0 to 13.8 wt. % can be preferably employed for the reasons to be described next.

In the conventional art, it was considered as disclosed, for example, in Japanese Patent Laid-Open No. 180907/1992 that a rubber-modified styrene resin having excellent impact resistance cannot be obtained when a styrene-butadiene copolymer containing 1,2-vinyl bonds in a proportion smaller than 14 wt. % is employed. According to the research by the present inventors, however, a styrene resin which was obtained using a styrene-butadiene copolymer containing 1,2-vinyl bonds in a proportion smaller than 14 wt. % and having an Mw/Mn ratio of 1.0 to 1.8 was imparted with the surprising characteristics unseen from conventional resins that it had similar impact resistance as a styrene resin obtained using a styrene-butadiene copolymer containing 1,2-vinyl bonds in a proportion of 14 wt. % or greater and that compared with the latter styrene resin, it underwent a smaller reduction in transparency upon molding or processing and a smaller change in hue and a smaller reduction in impact resistance when repeatedly heated. In particular, a resin obtained using a styrene-butadiene copolymer (B1) containing 1,2-vinyl bonds in a proportion of 4 to 12 wt. % has high transparency, a resin obtained using a styrene-butadiene copolymer (B1) containing 1,2-vinyl bonds in a proportion of 9 to 13.8 wt. % is excellent in impact resistance, a resin obtained using a styrene-butadiene copolymer (B1) containing 1,2-vinyl bonds in a proportion of 1 to 10% undergoes a smaller change in hue when heated, a resin obtained using a styrene-butadiene copolymer (B1) containing 1,2-vinyl bonds in a proportion of 6 to 11% is hardly reduced in impact resistance when heated, and a resin obtained using a styrene-butadiene copolymer (B1) containing 1,2-vinyl bonds in a proportion of 7 to 12% is reduced less in transparency when molded or processed. These resins are therefore preferred. The microstructure of a styrene-butadiene copolymer (B1) varies depending on parameters such as the type of a catalyst system upon production of the styrene-butadiene copolymer (B1), the composition of the catalyst system, additives and the reaction temperature. The proportion of 1,2-vinyl bonds in unsaturated bonds contained in the styrene-butadiene copolymer (B1) and derived from butadiene can be adjusted to a desired value by controlling one or more of the above parameters as needed. It is to be noted that the above-described characteristic property or properties cannot be brought about when a styrene-butadiene copolymer (B1) whose Mw/Mn ratio is outside the range of 1.0 to 1.8 is used although the proportion of 1,2-vinyl bonds in the styrene-butadiene copolymer (B1) falls within the range of 1 to 13.8 wt. %. Although it has not been elucidated why a resin having improved physical properties can be obtained by the use of the styrene-butadiene copolymer (B1) which has an Mw/Mn ratio in the range of 1.0 to 1.8 and contains 1,2-vinyl bonds in the specific proportion range based on unsaturated bonds derived from butadiene, certain influence is estimated to be given by an interaction between rubbery polymers having different molecular weights and also by an interaction between 1,2-vinyl bonds in each rubbery polymer or an interaction between 1,2-vinyl bonds and the styrene-alkyl (meth)acrylate copolymer.

The styrene-butadiene copolymer (B1) employed in the present invention is composed of 5 to 50 wt. % of styrene units and 50 to 95 wt. % of butadiene units. A resin obtained using a styrene-butadiene copolymer (B1) in which styrene units account for 5 to 30 wt. % is excellent in impact resistance, whereas a resin obtained using a styrene-butadiene copolymer (B1) in which styrene units account for 30 to 50 wt. % is superb in transparency. Use of a styrene-butadiene copolymer (B1) in which styrene units account for 15 to 35 wt. % can provide a resin in which transparency and impact resistance are well-balanced at high levels. A resin obtained using a styrene-butadiene copolymer (B1) in which styrene units account for 20 to 40 wt. % undergoes a smaller change in hue when heated. A proportion of styrene units smaller than 5 wt. % results in the formation of rubber particles having an unduly large particle size, whereby the resulting resin has low transparency. Such a low styrene unit proportion is therefore not preferred. A proportion of styrene units in excess of 50 wt. %, on the other hand, leads to a resin having lower impact resistance. Such a high styrene unit is therefore not preferred either.

Although the styrene-butadiene copolymer (B1) used in the present invention is a block copolymer formed from styrene and butadiene, its polystyrene blocks and polybutadiene blocks may be bonded together via a styrene-butadiene random copolymer.

The rubbery polymer (B) is used in a range of 2 to 12 parts by weight, preferably 3 to 10 parts by weight, more preferably 5 to 10 parts by weight per 100 parts by weight of the polymerization raw materials. Use of the rubbery polymer in an amount greater than 12 parts by weight makes it difficult to form the rubbery polymer into particles in a reaction tank. On the other hand, use of the rubbery polymer in an amount smaller than 2 parts by weight results in a resin having low impact resistance. It is therefore not preferred to use the rubbery polymer in any amount outside the above range.

The amount of the rubbery polymer (B) contained in 100 parts by weight of the resin so produced may preferably range from 4 parts by weight to 30 parts by weight. When the content of the rubbery polymer (B) falls within a range of 4 to 15 parts by weight, the resin has excellent impact resistance. When the content of the rubbery polymer falls within a range of 10 to 20 parts by weight, the resin has excellent balance between its impact resistance and its transparency. A content of the rubbery polymer greater than 30 parts by weight results in a substantial reduction in the transparency of the resin and is accordingly not preferred. On the other hand, a content of the rubbery polymer smaller than 4 parts by weight leads to a resin having low impact resistance. Such an unduly high or low content of the rubbery polymer is therefore not preferred.

Usable as the styrene monomer in the present invention is an unsaturated aromatic compound represented by the following formula (I):

wherein $R^1$ represents a hydrogen atom, a $C_{1-5}$ alkyl group or a halogen atom, $R^2$ represents a hydrogen atom, a $C_{1-5}$ alkyl group, a halogen atom or a $C_{1-5}$ unsaturated hydrocarbon group, and $R^2$ may be the same or different, especially, styrene or a derivative thereof. Usable examples of the styrene monomer include styrene, α-methylstyrene, o-methylstyrene, m-methylstyrene, p-methylstyrene, α-methyl-p-methylstyrene, halogenated styrenes, ethylstyrene, p-isopropylstyrene, p-t-butyl-styrene, 2,4-dimethylstyrene and divinylbenzene. They can be used either singly or in combination. Styrene has the highest general-purpose properties and is most economical. Use of α-methylstyrene leads to a resin improved in heat resistance. Use of p-methylstyrene or p-isopropylstyrene makes it possible to reduce the amount of the expensive alkyl (meth) acrylate to be employed, because the refractive index of p-methylstyrene or p-isopropylstyrene is lower than that of styrene and the refractive index of a continuous phase in the resulting rubber-modified resin can be lowered to a level similar to that of the particulate rubbery polymer. Moreover, problems associated with the use of the alkyl (meth)acrylate, namely, the high product cost, the hygroscopicity of the resin and the like can also be improved.

The styrene monomer is usually employed in a range of 15 to 85 parts by weight, preferably, 20 to 65 parts by weight per 100 parts of the sum of the individual monomers in the polymerization raw materials.

As the alkyl (meth)acrylate in the present invention, it is possible to use an unsaturated hydrocarbon compound represented by the following formula (II):

$$H_2C=C-\underset{\underset{O}{\|}}{C}-O-R^4 \quad \underset{|}{R^3} \qquad (II)$$

wherein $R^3$ represents a hydrogen atom or a methyl group and $R_4$ represents a $C_{1-5}$ alkyl group and having a refractive index lower than the rubbery polymer to be described subsequently. For example, one or more of methyl methacrylate, ethyl methacrylate, methyl acrylate, ethyl acrylate, n-butyl acrylate and the like can be used. Preferably, methyl methacrylate, ethyl acrylate or n-butyl acrylate is used, with methyl methacrylate being particularly preferred. These alkyl (meth)acrylates can be used either singly or in combination. A resin obtained using methyl methacrylate is improved in stiffness and weatherability, whereas a resin obtained using n-butyl acrylate is improved in flexibility. Use of ethyl acrylate can provide a resin which is improved in flexibility and owing to easier controllability of the rubber particle size, has high impact resistance. In particular, a mixture of methyl methacrylate and ethyl acrylate can be used preferably.

The alkyl (meth)acrylate is used generally in a range of 15 to 85 parts by weight, preferably in a range of 35 to 80 parts by weight per 100 parts by weight of the sum of the individual monomers in the polymerization raw materials.

To impart transparency to the rubber-modified styrene resin, the refractive index of the rubbery polymer must be made substantially equal to that of the copolymer of the styrene monomer and the alkyl (meth)acrylate. It is therefore necessary, as described above, to adjust the ratio of styrene monomer structural units to alkyl (meth)acrylate structural units in the copolymer in accordance with the molecular structure of the rubber employed.

Next, it is also necessary to determine the proportions of the styrene monomer and the alkyl (meth)acrylate in the polymerization raw materials. They can be calculated from the monomer reactivity ratios of the styrene monomer and the alkyl (meth)acrylate as described in P. J. Flory, *Principle of Polymer Chemistry*, Chapter 5 "Copolymerization, Emulsion Polymerization and Ionic Polymerization", especially on page 169 of its Japanese-language version. Described specifically, when copolymerizing a monomer $M_1$ with a monomer $M_2$, the following formula (4) can be established:

where
[$M_1$]: the concentration of the monomer $M_1$,
$r_1$: the monomer reactivity ratio of the monomer $M_1$,
[$M_2$]: the concentration of the monomer $M_2$, and
$r_2$: the monomer reactivity ratio of the monomer $M_2$.

On the other hand, the monomer reactivity r can be expressed by the following formula (5) from the Q–e scheme as described in Chapter 5, page 189 of the Japanese-language version:

$$r_1=(Q_1/Q_2)\exp[-e_1(e_1-e_2)] \qquad (5)$$

Here, Q and e are parameters which represent the degrees of resonance stabilization and polar effect of each monomer, and can be found in a publication such as J. Brandrup and E. H. Immergut, *Polymer Handbook*, 3rd ed., II, 267–274, John Wiley & Sons, New York, N.Y. (1989), In the case of styrene, for example, Q=1.00 and e=–0.80. In the case of methyl methacrylate, on the other hand, Q=0.78 and e=0.40.

Further, as is described in Chapter 5, page 175 of the Japanese-language version, the copolymer composition can be expressed as a function of polymerization degree. By solving the above formulae, the proportions of the styrene monomer and the alkyl (meth)acrylate in the copolymerization raw materials can be determined. This has made it possible to provide the rubber-modified styrene resin with transparency.

In the process of the present invention, the copolymer (A) of the styrene monomer and the alkyl (meth)acrylate and the rubbery polymer (B) should have substantially the same refractive index. The absolute value of the difference in refractive index between the copolymer (A) and the rubbery polymer (B) may preferably be 0.01 or smaller, with 0.008 or smaller being particularly preferred.

A polymerization initiator can be used in the present invention. Illustrative usable examples include organic peroxides such as benzoyl peroxide, lauroyl peroxide, t-butyl peroxypivalate, t-butyl peroxybenzoate, t-butyl peroxyisobutyrate, t-butyl peroxy(2-ethylhexanoate), t-butyl peroxyoctoate, cumyl peroxyoctoate and 1,1-bis(t-butylperoxy)-3,3,3-trimethylcyclohexane; and azo compounds such as 2,2-azobisisobutyronitrile, 2,2-azobis(2-methylbutyronitrile) and 2,2-azobis(2,4-dimethylvaleronitrile). Use of an organic peroxide is however preferred because high grafting efficiency can be obtained more easily. A polymerization initiator can be chosen based on its half life in view of the temperature of a reaction tank to which the polymerization initiator is to be added, the average residence time of a polymerization mixture in the reaction tank and a target degree of polymerization converison. For example, it is preferred to use a polymerization initiator having a half life of 1 minute to 2 hours at 90° C. when polymerization is conducted at 80° to 100° C., a polymerization initiator having a half life of 10 minutes to 20 hours at 90° C. when polymerization is conducted at 100° to 140° C., or a polymerization initiator having a half life of 2 hours or longer at 90° C. when polymerization is conducted at 140° to 160° C.

It is preferred to use t-butyl peroxypivalate, t-butyl peroxy (2-ethylhexanoate) or 1,1-bis(t-butyl-peroxy)-3,3,5-trimethylcyclohexanone, with t-butyl-peroxy (2-ethylhexanoate) or 1,1-bis(t-butylperoxy)-3,3,5-trimethylcyclohexanone being particularly preferred.

The polymerization initiator is used in a range of 0.001 to 5.0 parts by weight in general, preferably 0.001 to 3.5 parts by weight, more preferably 0.001 to 2.0 parts by weight per 100 parts by weight of the sum of the monomers in the polymerization raw materials. If the amount of the polymerization initiator exceeds 5.0 parts by weight, decomposition products of the unreacted polymerization initiator accumulate in the polymerization system and inhibit the polymerization. It is therefore not preferred to use the polymerization initiator in such a large amount. On the other hand, use of the polymerization initiator in an amount smaller than 0.001 part by weight however leads to a high polymerization temperature so that the polymerization reaction tends to run away. It is therefore not preferred to use the polymerization initiator in such a small amount either.

In the present invention, an organic solvent can be used as needed. Illustrative usable examples include benzene, toluene, xylene, ethylbenzene, acetone, isopropylbenzene, methyl ethyl ketone and dimethylformamide. Use of ethylbenzene or toluene is particularly preferred. When an organic solvent is employed, the concentrations of the monomers and the concentration of the resulting copolymer in the polymerization mixture become lower. The polymerization velocity can therefore be lowered to an easily-controllable level, thereby making it possible to prevent runaway of the polymerization reaction. Moreover, the viscosity of the polymerization mixture is lowered so that uniform mixing of the polymerization mixture and transfer of the polymerization mixture can be facilitated. The operability as a production process can hence be improved. However, an unduly high concentration of the organic solvent in the polymerization mixture results in an unduly low polymerization velocity, thereby lowering the productivity. Moreover, upon transformation of the rubber polymer into a dispersed phase, particles of the rubbery polymer tend to agglomerate in the course of polymerization, leading to a reduction in the transparency of the resin. Such an unduly high or low polymerization velocity is therefore not preferred. In the reaction tank, the organic solvent is therefore used in a range of 5 to 50 parts by weight in general, preferably 10 to 30 parts by weight, more preferably 15 to 25 parts by weight per 100 parts by weight of the whole polymerization mixture.

In the present invention, the production can also be performed without any organic solvent. Further, the polymerization can be performed by adding the organic solvent in a relatively small amount. In general, polymerization in the present of a small amount of a solvent is also called "bulk polymerization" so that it cannot be strictly distinguished from solution polymerization and as a matter of fact, has no need to be distinguished therefrom. Nevertheless, distinguishing from emulsion polymerization, in the presence of a solvent in an amount up to the upper limit of the above-described range is called bulk polymerization or solution polymerization in the present invention.

To control the molecular weight of the copolymer of the styrene monomer and the alkyl (meth)acrylate, a variety of known chain transfer agents can be used in the present invention.

For example, known chemical substances such as t-todecylmercaptan, n-todecylmercaptan, n-octylmercaptan and α-methylstyrene dimer can be used. t-Dodecylmercaptan is economical and has high general-purpose properties, n-dodecylmercaptan makes it possible to reduce the amount of a chain transfer agent to be used because of its high chain transfer ability, and α-methylstyrene dimer permits production of a low-odor resin because it does not contain any mercapto group. Although the amount of the chain transfer agent to be used varies depending on its chain transfer ability and the target molecular weight of the resulting copolymer, it can be used generally in a range of 0.001 to 5.0 parts by weight per 100 parts by weight of the individual monomers in the polymerization raw materials.

As the reaction tank in the present invention, a complete-mixing reaction tank is preferred for its easy controllability of the particle size of the resulting rubbery polymer and also its high ability to evenly mix the polymerization mixture. Regarding the number of reaction tank(s) making up a polymerizer, it is preferred to employ a single reaction tank from the standpoints of the uniformity and controllability of the styrene monomer-alkyl (meth)acrylate polymer composition. It is however possible to conduct polymerization through plural tanks, that is, in a polymerizer composed of 2 to 4 reaction tanks connected together by performing the polymerization to divided degrees, for example, increasing the polymerization degree in a primary reaction tank but decreasing the polymerization degree in each of the remaining reaction tanks to such a level as not affecting the transparency or by controlling the monomer ratio in each reaction tank so that the composition of the resulting copolymer remains constant.

The reaction tank may preferably be equipped, as a system for removing heat of polymerization, with a system for removing heat by causing a heat transfer medium to flow through a jacket or draft tubes or with a system for vaporizing low b.p. components such as the monomers and the organic solvent and cooling the polymerization mixture with the latent heat of vaporization.

For uniform mixing of the polymerization mixture and also for the formation of the rubbery polymer into particles, the reaction tank is provided with stirring blades. Illustrative usable stirring blades include known stirring blades such as a paddle blade, a turbine blade, a propeller blade, a lattice blade, a pfaudlar blade, a gate blade and a helical ribbon blade. These stirring blades can be used either singly or in combination. Regarding the construction of the stirring blade, it can be a single-stage blade or a multi-stage blade. Although the rotational speed of the stirring blade varies depending on the volume of the reaction tank, the viscosity of the polymerization mixture, the required shear force, and the like, the rotational speed generally ranges from 3 rpm to 600 rpm.

In the present invention, the polymerization is conducted generally in a range of 80° to 160° C., preferably in a range of 100° to 140° C. A polymerization temperature lower than 800C is not preferred, because the productivity is poor due to a low polymerization velocity and the thermal load required to vaporize the unreacted monomers and organic solvent in a volatile elimination unit arranged on a downstream side. On the other hand, a polymerization temperature higher than 160° C. tends to cause runaway of the polymerization reaction and has difficulty in maintaining polymerization conditions for a long time. To operate the present invention as an actual plant, such a high temperature involves a serious problem in the operation stability of the plant, hence, in the ability to stably produce a resin having high degrees of transparency and impact resistance. In addition, a polymerization temperature higher than 160° C. forms copolymers of low molecular weights in large quantities, thereby deteriorating the moldability or processability of the product.

The average residence time of the polymerization mixture in the reaction tank in the present invention may appropriately be 0.2 to 5.0 hours, with 1.5 to 3.5 hours being preferred. If the average residence time is shorter than 0.2 hour, the polymerization raw materials may pass through the reaction tank before they are fully polymerized, resulting in a product of reduced properties. If the average residence time is longer than 5.0 hours, the production decreases, the production cost of the resin increases and the productivity is lowered. An average residence time outside the above-described range is therefore not preferred.

In the present invention, the rubbery polymer is caused to transform into particles having a particle size of 0.1 to 2.0 $\mu$m and preferably a particle size distribution index of 2.0 to 5.0 and dispersed in a continuous phase formed of the styrene-alkyl (meth)acrylate copolymer in the state that the solid content of the polymerization mixture is 10 to 60 wt. %, preferably 15 to 50 wt. %.

Where one reaction tank is used, the solid content in the polymerization mixture may preferably range from 30 to 60 wt. %, with a range of 30 to 50 wt. % being preferred. The term "the solid content of the polymerization mixture" as used herein means the sum of the rubbery polymer and the styrene-alkyl (meth)acrylate copolymer contained in the polymerization mixture.

The primary factor which governs the transformation of the rubbery polymer into the dispersed phase is the weight ratio of the rubbery polymer and the resulting styrene-alkyl (meth)acrylate copolymer. If the amount of the copolymer exceeds about twice the amount of the rubbery polymer in the polymerization mixture, phase transition takes place. It has been found in the present invention that the particle size and particle size distribution of the rubbery polymer after the phase transition can be controlled within predetermined ranges by controlling the solid content of the polymerization mixture to the range of 10 to 60 wt. % while maintaining the molecular structure of the rubbery polymer, the concentration of the rubbery polymer, the amount of the polymerization initiator and the polymerization temperature under the above-described specific conditions.

If the. solid content of the polymerization mixture becomes smaller than 10 wt. % or greater than 60 wt. %, the particle size and particle size distribution of the rubbery polymer become substantially great, thereby resulting in a resin having reduced transparency and impact resistance. A solid content outside the above range is therefore not preferred. If phase transition is caused to occur at 50 wt. % or lower solid content of the polymerization mixture, the resulting resin has an improved retention of transparency, especially, transparency upon molding or forming. Such a solid content is therefore preferred.

The average particle size of particles of the rubbery polymer contained in the rubber-modified styrene resin according to the present invention ranges from 0.1 $\mu$m to 2.0 $\mu$m. An average particle size smaller than 0.1 $\mu$m leads to a resin having low impact resistance, whereas an average particle size greater than 2.0 $\mu$m results in a resin low in both transparency and impact resistance. An average particle size outside the above range is therefore not preferred. In particular, a resin in which the rubbery polymer has an average particle size of 0.1 to 1.0 $\mu$m, preferably, 0.2 to 0.5 $\mu$m is excellent in transparency, a resin in which the rubbery polymer has an average particle size of 0.4 to 2.0 $\mu$m, preferably, 0.5 to 1.6 $\mu$m is excellent in impact resistance, and a resin in which the rubbery polymer has an average particle size of 0.2 to 1.3 $\mu$m, preferably, 0.3 to 0.8 $\mu$m is excellent in the balance between transparency and impact resistance.

The particle size distribution index is preferably in the range of 2.0 to 5.0. A particle size distribution index greater than 2.0 provides a resin having high impact resistance, whereas a particle size distribution index smaller than 5.0 has good transparency. In particular, a resin whose particle size distribution index is 2.0 to 4.0, preferably 3.0 to 4.0 is excellent in the retention of transparency, especially, transparency upon molding or processing. A resin whose particle size distribution index is 2.5 to 5.0, preferably, 2.5 to 4.0 is excellent in impact resistance, and a resin whose particle size distribution index is 2.2 to 3.5 is excellent in the balance between transparency and impact resistance. Incidentally, measuring methods of the particle size and particle size distribution index of each rubbery polymer will be described in Example 1.

The polymerization mixture continuously drawn out of the reaction tank is continuously supplied to such a volatile elimination unit as disclosed, for example, in Japanese Patent Publication No. 29798/1973, Japanese Patent Laid-Open No. 228012/1986, Japanese Patent Laid-Open No. 179508/1987 or Japanese Patent Publication No. 56242/1991, where volatile substances such as the un- reacted monomers and the organic solvent are eliminated from the polymerization mixture. The solid content of the polymerization mixture at this time may preferably be 20 to 75 wt. %, with 20 to 60 wt. % being more preferred.

Although no particular limitation is imposed on the subsequent steps, a transparent styrene resin is produced through an extrusion step and an additive feeding step, which are both routinely conducted in a production process of a styrene resin by continuous bulk or solution polymerization.

The transparent styrene resin obtained according to the present invention can be used, for its excellent transparency and impact resistance, as sheets and packaging materials such as IC cases and blister cases; as home electric and electronic appliances such as washing machines, air conditioners, refrigerators and AV equipments; as general equipments such as office automation equipments, telephones and music instruments; as sundries such as toys, games, dolls and cosmetic containers; and as structural materials such as automotive materials and housing materials. The transparent styrene resin according to the present invention therefore has extremely large industrial utility and value.

The present invention will hereinafter be described more specifically by the following examples and comparative examples. It is however borne in mind that the present invention is by no means limited by them.

Incidentally, the analysis of each styrene resin and the evaluation of its physical properties were conducted by the following methods.

(a) Average particle size and particle size distribution index of each rubbery polymer An ultrathin section of the rubber-modified styrene resin, which had been stained with osmic acid, was photographed under a transmission electron microscope. The particles sizes of about 500 to 700 particles of the rubbery polymer in the micrograph were measured. An average of the measurement data as calculated lated in accordance with the below-described formula (6) is the average particle size $$\text{Average particle size of rubbery polymer} = \Sigma nD^4 / \Sigma nD^3 \qquad (6)$$

where n: the number of particles of the rubbery polymer, which has a particle size D.

On the other hand, the particle size distribution index is an index expressed by the following formula (7):

$$\text{Particle size distribution index of rubbery polymer} = DA/DB \tag{7}$$

where

DA: the particle size when the cumulative volume fraction of particle sizes from the larger particle sizes has reached 10%, and DB: the particle size when the cumulative volume fraction of particle sizes from the larger particle sizes has reached 90%.

(b) Preparation of test specimens

The resulting resins were each injection molded at a molding temperature of 240° C. and a mold temperature of 50° C., whereby test specimens for the measurement of Izod impact strength, test specimens for the measurement of whole light transmittance and haze, test specimens for the measurement of hue (thickness: 2.5 mm, length: 15 cm, width: 10 cm) and test specimens for the measurement of practical impact strength, the last-mentioned specimens having configurations shown in FIGS. 1 and 2, were prepared.

(c) Whole light transmittance and haze

Measured in accordance with ASTM-D1003. A smaller haze value indicates superior transparency.

(d) Fluidity (MFI) of resins

Measured at 200° C. under the load conditions of 5 kg in accordance with ASTM-D1238.

(e) Izod impact strength

Measured in accordance with JIS K-6871.

(f) Practical impact strength

With respect to three positions (position S, position T, position U) of each test specimen of the configurations shown in FIGS. 1 and 2, a falling dart impact strength test was conducted. The leading end portion of the dart had a radius of 6.4 mm and the inner diameter of a support was set at 25 mm. In FIG. 1, a gate portion, that is, an inlet through which a molten resin flows into a mold is designated at letter G. Because of the position of the gate position, the thickness varies at the position S. The position T is close to a corner, while the position U is a standard position. In general, the impact strength tends to increase in the order of the position S, the position T and the position U.

(g) Copolymer composition

To determine the composition of each copolymer of the styrene monomer and the alkyl (meth)acrylate, the copolymer was subjected to an elemental analysis. From the percentage of oxygen, the amount of the alkyl (meth) acrylate in the copolymer was calculated.

(h) Change in transparency upon forming or processing

Using a 30-mm sheet extruder, each resin was formed into a sheet of 0.3 mm in thickness (primary processing). The sheet was then formed into a food package of 15 cm in length, 10 cm in width and 5 cm in depth by vacuum forming (secondary processing). A side wall of the food package was cut out and its haze (H) was measured. The ratio (H/h) of the haze (H) to the haze (h) of the sheet from which the food package was formed was determined. A resin whose H/h ratio is closer to 1 is excellent in the retention of transparency upon forming or processing.

(i) Hue

Test specimens were prepared before and after each resin was heated. Following JIS-K7105, the color difference by the Lab system was measured. A smaller color difference value indicates that a resin is less affected by heat and is hence superior.

EXAMPLE 1

Using a continuous polymerizer composed of one complete-mixing reaction tank whose capacity was 20 l, a styrene resin was produced. Styrene was used as a styrene monomer, while methyl methacrylate was employed as an alkyl (meth)acrylate. Employed as a rubbery polymer was a block copolymer ("NIPOL:NS310S", trade name; product of Nippon Zeon Co., Ltd.), which had a viscosity of 11 cps when measured at 25° C. as a 5 wt. % styrene solution and an Mw/Mn ratio of 1.1 and was composed of 23 wt. % of polystyrene and 77 wt. % of polybutadiene. In the block polymer, 1,2-vinyl bonds accounts for 20 wt. % of unsaturated bonds derived from butadiene. Further, 1,1-bis(t-butylperoxy)-3,3,5-trimethylcyclohexane was employed as a polymerization initiator. Polymerization raw materials consisting of 25 parts by weight of styrene, 49 parts by weight of methyl methacrylate, 20 parts by weight of ethylbenzene, 6 parts by weight of the rubbery polymer, 0.2 part by weight of t-dodecylmercaptan and 0.03 part by weight of the polymerization initiator were continuously fed at 10 kg/hr to the reaction tank by a plunger pump to perform polymerization. The polymerization temperature was adjusted to control the solid content at an outlet of the reaction tank to 45.0 wt. % based on the polymerization mixture and the degree of polymerized conversion to 52.7 wt. %. The polymerization temperature at that time was 135° C. Incidentally, the stirring speed of the reaction tank was 150 rpm and, when the polymerization temperature was measured by inserting a thermocouple into three parts, that is, an upper part, a middle part and a lower part in the reaction tank, the temperatures in these three parts were controlled within a range of the average value ±0.2° C. The polymerization mixture was therefore considered to be uniformly mixed. The proportions of styrene and methyl methacrylate in the polymerization raw materials were 33.8 wt. % and 66.2 wt. %, respectively. Subsequent to the polymerization, the polymerization mixture continuously drawn out of the reaction tank was fed to a volatile elimination unit to separate the unreacted monomers, the organic solvent and the like. Thereafter, the resultant resin was pelletized through an extruder. Production conditions for the styrene resin and the analysis and physical property evaluation results of the styrene resin composition so produced are presented in Table 1 and Table 2, respectively. From the results of an elemental analysis, the proportions of styrene structural units and methyl methacrylate structural units in the styrene resin composition were found to be 37 wt. % and 63 wt. %, respectively. As a result of calculation of refractive indices, the refractive index of the rubber polymer and that of the styrene-methyl methacrylate copolymer were found to be 1.5278 and 1.5258, respectively. Their difference in refractive index is therefore calculated to be 0.002, which satisfies the condition that the difference in refractive index should be 0.01 or smaller.

EXAMPLES 2 TO 4 & COMPARATIVE EXAMPLE 1

Styrene resins were produced in exactly the same manner as in Example 1 except that as rubbery polymers, a block copolymer having a solution viscosity of 20 cps when measured at 25° C. as a 5 wt. % styrene solution and a Mw/Mn ratio of 1.1 and composed of 23 wt. % of polystyrene and 77 wt. % of polybutadiene was used in Example 2, a block copolymer having a solution viscosity of 35 cps when measured at 25° C. as a 5 wt. % styrene solution and a Mw/Mn ratio of 1.1 and composed of 23 wt. % of polystyrene and 77 wt. % of polybutadiene was used in Example 3, a block copolymer having a solution viscosity of 50 cps when measured at 25° C. as a 5 wt. % styrene solution and a Mw/Mn ratio of 1.1 and composed of 23 wt. % of polystyrene and 77 wt. % of polybutadiene was used in Example 4, and a block copolymer having a solution viscosity of 70 cps when measured at 25° C. as a 5 wt. % styrene solution and a Mw/Mn ratio of 1.1 and composed of 23 wt. % of polystyrene and 77 wt. % of polybutadiene was used in Comparative Example 1. The block copolymers were all produced by solution polymerization while using a lithium-base catalyst. Production conditions for the styrene resins and the analysis and physical property evaluation results of the styrene resin compositions so produced are presented in Table 1 and Table 2, respectively. The solution viscosities of the used rubbery polymers became higher in the order of Example 1 Example 2, Example 3, Example 4 and Comparative Example 1. Example 1 was excellent in transparency, Example 2 was excellent in the balance between transparency and impact resistance, and Example 3 was excellent in impact resistance.

EXAMPLE 5 & COMPARATIVE EXAMPLE 2

Styrene resins were produced in exactly the same manner as in Example 1 except that as rubbery polymers, a block copolymer having a solution viscosity of 10 cps when measured at 25° C. as a 5 wt. % styrene solution and a Mw/Mn ratio of 1.5 and composed of 23 wt. % of polystyrene and 77 wt. % of polybutadiene was used in Example 5 and a block copolymer having a solution viscosity of 10 cps when measured at 25° C. as a 5 wt. % styrene solution and a Mw/Mn ratio of 2.2 and composed of 21 wt. % of polystyrene and 79 wt. % of polybutadiene was used in Comparative Example 2. The block copolymers were both produced by solution polymerization while using a lithium-base catalyst. Production conditions for the styrene resins and the analysis and physical property evaluation results of the styrene resin compositions so produced are presented in Table 1 and Table 2, respectively. The Mw/Mn ratios of the rubbery polymers increased in the order of Example 1, Example 5 and Comparative Example 2. Example 1 was excellent in transparency, and Example 5 was excellent in impact resistance.

EXAMPLE 6

A styrene resin was produced in exact the same manner as in Example 1 except that the amount of the rubbery polymer in the polymerization raw materials was 12 parts by weight, the proportions of styrene and methyl methacrylate in the polymerization raw materials were 33.8 wt. % and 66.2 wt. %, respectively, and the polymerization temperature was 133° C. Production conditions for the styrene resin and the analysis and physical property evaluation results of the styrene resin composition so produced are presented in Table 1 and Table 2, respectively. Example 6 had higher impact resistance compared with Example 1 because the amount of the rubber polymer in the product was high in Example 6.

EXAMPLE 7 & COMPARATIVE EXAMPLE 3

Styrene resins were produced in exactly the same manner as in Example 1 except that as rubbery polymers, a blend of a block copolymer having a solution viscosity of 11 cps when measured at 25° C. as a 5 wt. % styrene solution and a Mw/Mn ratio of 1.1 and composed of 23 wt. % of polystyrene and 77 wt. % of polybutadiene and polybutadiene having a viscosity of 35 cps when measured at 25° C. as a 5 wt. % styrene solution and having an Mw/Mn ratio of 1.5 was used, and the blend ratio of the block copolymer to the polybutadiene (the copolymer/polybutadiene) was 90/10 (by weight) in Example 7 and 50/50 (by weight) in Comparative Example 3. The analysis and physical property evaluation results of the styrene resin compositions so produced are presented in Table 1 and Table 2, respectively. Compared with Example 1, Example 7 was higher in impact resistance. Comparative Example 3 was lower in both transparency and impact resistance than Example 1.

EXAMPLE 8 & COMPARATIVE EXAMPLES 4, 5 and 6

Styrene resins were produced in exactly the same manner as in Example 1 except that the amounts of styrene and methyl methacrylate in the polymerization raw materials were changed to 33 parts by weight and 41 parts by weight in Example 8, to 14 parts by weight and 60 parts by weight in Comparative Example 4, to 38 parts by weight and 36 parts by weight in Comparative Example 5, and to 19 parts by weight and 49 parts by weight in Comparative Example 6. Production conditions for the styrene resins and the analysis and physical property evaluation results of the styrene resin compositions so produced are presented in Table 1 and Table 2, respectively. The difference in refractive index between the rubbery polymer and the copolymer was 0.002 in Example 1, 0.008 in Example 8, 0.0184 in Comparative Example 4, 0.0122 in Comparative Example 5, and 0.0120 in Comparative Example 6. When the difference in refractive index between the rubbery polymer and the copolymer exceeded 0.01, the transparency became considerably lower.

EXAMPLES 9 AND 10 & COMPARATIVE EXAMPLES 7

Styrene resins were produced in exactly the same manner as in Example 1 except that the polymerization temperature was set at 144° C. in Example 9, at 122° C. in Example 10 and at 158° C. in Comparative Example 7. Production conditions for the styrene resins and the analysis and physical property evaluation results of the styrene resin compositions so produced are presented in Table 1 and Table 2, respectively. The solid content of the polymerization mixture was 35 wt. % in Example 10 , 45 wt. % in Example 1, 55 wt. % in Example 9 and 65 wt. % in Comparative Example 7. It is understood that, when the solid content of the polymerization mixture exceeds 60 wt. %, the average particle size of the rubbery polymer becomes large and the transparency and impact resistance of the resin drop substantially.

EXAMPLE 11

Using a continuous polymerizer composed of one complete-mixing reaction tank whose capacity was 20 l, a styrene resin was produced. Styrene was used as a styrene monomer, while a mixture of methyl methacrylate and ethyl acrylate was employed as an alkyl (meth)acrylate. Employed as a rubbery polymer was a styrene-butadiene block copolymer, which was composed of 25 wt. % of styrene and 75 wt. % of butadiene, contained 1,2-vinyl bonds in a proportion of 10 wt. % based on unsaturated bonds derived from butadiene, had a viscosity of 12 cps when measured at 25° C. as a 5 wt. % styrene solution and possessed an Mw/Mn ratio of 1.1. The copolymer was produced by solution polymerization while using a lithium-based catalyst. Further, t-butylperoxy (2-ethylhexanoate) was employed as a polymerization initiator. Polymerization raw materials consisting of 30 parts by weight of styrene, 36 parts by weight of methyl methacrylate, 9 parts by weight of ethyl acrylate, 20 parts by weight of ethylbenzene, 5 parts by weight of the rubbery polymer, 0.07 part by weight of t-dodecylmercaptan and 0.03 part by weight of the polymerization initiator were continuously fed at 10 kg/hr to the reaction tank by a plunger pump to perform polymerization. The polymerization temperature was adjusted to control the solid content at an outlet of the reaction tank to 47.0 wt. % based on the polymerization mixture and the degree of polymerized conversion to 56.0 wt. %. The polymerization temperature at that time was 137° C. The stirring speed of the reaction tank was 150 rpm and, when the polymerization temperature was measured by inserting a thermocouple into three parts, that is, an upper part, a middle part and a lower part in the reaction tank, the temperatures in these three parts were controlled within a range of the average value ±0.2° C. The polymerization mixture was therefore considered to be uniformly mixed. The proportions of styrene, methyl methacrylate and ethyl acrylate in the polymerization raw materials were 40 wt. %, 48 wt. % and 12 wt. % respectively. Subsequent to the polymerization, the polymerization mixture continuously drawn out of the reaction tank was fed to a volatile elimination unit to separate the unreacted monomers, the organic solvent and the like. Thereafter, the resultant resin was pelletized through an extruder. Production conditions for the styrene resin and the analysis and physical property evaluation results of the styrene resin composition so produced are presented in Table 1 and Table 2, respectively. Compared with Example 16 to be described subsequently herein, the change in transparency upon forming was smaller. Even when the proportion of 1,2-vinyl bonds in unsaturated bonds derived from butadiene in a rubbery polymer is smaller than 14 wt. %, the resulting resin is recognized to have sufficient impact resistance. To observe changes in physical properties upon heating, an model experiment was conducted as will be described hereinafter. The resin was fed to a 40-mm single-screw extruder (L/D=30, L: full flighted length of screw, D: cylinder diameter), heated and molten, cooled with water to solidify again, and then pelletized by a grinder. The cylinder temperature, die temperature and screw speed of the extruder were set at 220° C., 230° C. and 100 rpm, respectively. The physical property evaluation results of the styrene resin after that work had been repeated 5 times are presented in Table 1. It is appreciated that compared with Example 16 to be described subsequently herein, the resin of Example 11 has a higher retention of impact resistance and undergoes a smaller change in hue. Among the resins of the Examples, the resin of Example 11 is excellent especially in the retention of transparency upon forming.

EXAMPLE 12

A styrene resin was produced using a continuous polymerizer which had been constructed by connecting two complete-mixing reaction tanks of the same type as that employed in Example 11. Styrene was used as a styrene monomer, while a mixture of methyl methacrylate and ethyl acrylate was employed as an alkyl (meth)acrylate. Employed as a rubbery polymer was the same rubbery polymer as that used in Example 11. Further, 1,1-bis(t-butylperoxy)-3,3,5-trimethylcyclohexane was employed as a polymerization initiator. Polymerization raw materials consisting of 30 parts by weight of styrene, 36 parts by weight of methyl methacrylate, 9 parts by weight of ethyl acrylate, 20 parts by weight of ethylbenzene, 5 parts by weight of the rubbery polymer, 0.07 part by weight-of t-dodecylmercaptan and 0.03 part by weight of the polymerization initiator were continuously fed at 10 kg/hr to the first reaction tank by a plunger pump to perform polymerization. The polymerization temperature was adjusted to control the solid content at an outlet of the first reaction tank to 29.0 wt. % based on the polymerization mixture and the degree of polymerized conversion to 32.0 wt. %. The polymerization temperature at that time was 115° C. The stirring speed of the reaction tank was 150 rpm. The polymerization mixture continuously drawn out of the first reaction tank was fed the downstream second reaction tank and was polymerized under stirring at 150 rpm. The polymerization temperature was adjusted to control the solid content at an outlet of the second reaction tank to 47.0 wt. % based on the polymerization mixture and the degree of polymerized conversion to 56.0 wt. %. The polymerization temperature at that time was 130° C. The polymerization mixture continuously drawn out of the second reaction tank was then fed to a volatile elimination unit to separate the unreacted monomers, the organic solvent and the like. Thereafter, the resultant resin was pelletized through an extruder. The physical property evaluation results of the styrene resin so obtained are presented in Table 1 and Table 2, respectively. It is recognized that compared with Example 17 to be described subsequently herein, the resin of Example 12 undergoes a smaller change in transparency upon forming and has sufficient impact resistance. It is also appreciated that when heated, the reduction in impact resistance is minimized and the change in hue is small. Among the resins of the Examples, the resin of Example 12 is excellent in impact resistance, especially in the retention of impact resistance after heated.

EXAMPLE 13

Using the same continuous polymerizer as that employed in Example 11, a styrene resin was produced. Styrene was used as a styrene monomer, while methyl methacrylate was employed as an alkyl (meth)acrylate. Employed as a rubbery polymer was the same rubbery polymer as that used in Example 11. Further, 1,1-bis(t-butylperoxy)-3,3,5-trimethylcyclohexane was employed as a polymerization initiator. Polymerization raw materials consisting of 27 parts by weight of styrene, 48 parts by weight of methyl methacrylate, 20 parts by weight of ethylbenzene, 5 parts by weight of the rubbery polymer, 0.2 part by weight of t-dodecyl-mercaptan and 0.03 part by weight of the polymerization initiator were continuously fed at 10 kg/hr to the reaction tank by a plunger pump to perform polymerization. The polymerization temperature was adjusted to control the solid content at the outlet of the reaction tank to 47.0 wt. % based on the polymerization mixture and the degree of polymerized conversion to 56.0 wt. %. The polymerization temperature at that time was 141° C. The stirring speed of the reaction tank was 150 rpm. The proportions of styrene and methyl methacrylate in the polymerization mixture were 36 wt. % and 64 wt. %, respectively. Subsequent to the polymerization, volatile substances were eliminated from the polymerization mixture and the resultant resin was pelletized through an extruder. The analysis and physical property evaluation results of the styrene resin so obtained are presented in Table 1 and Table 2, respectively. It is recognized that compared with Example 18 to be described subsequently herein, the resin of Example 13 undergoes a smaller change in transparency upon forming and has sufficient impact resistance. Among the resins of the Examples, the resin of Example 13 is excellent in that it undergoes a smaller change in hue when heated.

EXAMPLE 14

A styrene resin was produced in exactly the same manner as in Example 11 except that as the rubbery polymer, a styrene-butadiene block copolymer composed of 25 wt. % of styrene and 75 wt. % of butadiene, containing 1,2-vinyl bonds in a proportion of 13 wt. % based on unsaturated bonds derived from butadiene, having a viscosity of 12 cps when measured at 25° C. as a 5 wt. % styrene solution and possessing an Mw/Mn ratio of 1.1 was used. The copolymer was produced by solution polymerization while using a lithium-base catalyst. The analysis and physical property evaluation results of the styrene resin so obtained are presented in Table 1 and Table 2, respectively. It is understood that compared with Examples 11, 14 and 16, a departure of the proportion of 1,2-vinyl bonds based on unsaturated bonds derived from butadiene from the range of 1 to 13.8 wt. % results in reductions in impact resistance and hue after the resin is heated.

EXAMPLE 15 & COMPARATIVE EXAMPLE 8

Styrene resins were produced in exactly the same manner as in Example 11 except that the polymerization temperature was changed to 126° C. in Example 15 and to 159° C. in Comparative Example 8. The analysis and physical property evaluation results of the styrene resins so obtained are presented in Table 1 and Table 2, respectively, The solid content in the polymerization mixture was 35 wt. % in Example 15, 47 wt. % in Example 11 and 65 wt. % in Comparative Example 8. It is appreciated that, when the solid content of the polymerization mixture exceeds 60 wt. %, the transparency and impact resistance of the resin drop.

EXAMPLE 16

A styrene resin was produced in exactly the same manner as in Example 11 except that as the rubbery polymer, a styrene-butadiene block copolymer composed of 25 wt. % of styrene and 75 wt. % of butadiene, containing 1,2-vinyl bonds in a proportion of 20 wt. % based on unsaturated bonds derived from butadiene, having a viscosity of 12 cps when measured at 25° C. as a 5 wt. % styrene solution and possessing an Mw/Mn ratio of 1.1 was used. The copolymer was produced by solution polymerization while using a lithium-base catalyst. The analysis and physical property evaluation results of the styrene resin so obtained are presented in Table 1 and Table 2, respectively.

EXAMPLE 17

A styrene resin was produced in exactly the same manner as in Example 12 except that as the rubbery polymer, the same rubbery polymer as that used in Example 16 was used. The analysis and physical property evaluation results of the styrene resin so obtained are presented in Table 1 and Table 2, respectively.

EXAMPLE 18

A styrene resin was produced in exactly the same manner as in Example 13 except that as the rubbery polymer, the same rubbery polymer as that used in Example 16 was used. The analysis and physical property evaluation results of the styrene resin so obtained are presented in Table 1 and Table 2, respectively.

TABLE 1

| Item | Unit | Example 1 | 2 | 3 | 4 | 5 | 6 | 7 | 8 | 9 |
|---|---|---|---|---|---|---|---|---|---|---|
| Composition of polymerization raw materials | | | | | | | | | | |
| Styrene (ST) | wt. parts | 25.0 | 25.0 | 25.0 | 25.0 | 25.0 | 23.0 | 25.0 | 33.0 | 25.0 |
| Methyl methacrylate (MMA) | wt. parts | 49.0 | 49.0 | 49.0 | 49.0 | 49.0 | 45.0 | 49.0 | 41.0 | 49.0 |
| Ethyl acrylate (EA) | wt. parts | 0.0 | 0.0 | 0.0 | 0.0 | 0.0 | 0.0 | 0.0 | 0.0 | 0.0 |
| Rubbery polymer | wt. parts | 6.0 | 6.0 | 6.0 | 6.0 | 6.0 | 12.0 | 6.0 | 6.0 | 6.0 |
| Ethylbenzene | wt. parts | 20.0 | 20.0 | 20.0 | 20.0 | 20.0 | 20.0 | 20.0 | 20.0 | 20.0 |
| t-Dodecylmercaptane | $\times 10^{-2}$ wt. parts | 20.0 | 20.0 | 20.0 | 20.0 | 20.0 | 20.0 | 20.0 | 20.0 | 20.0 |
| Polymerization initiator | $\times 10^{-2}$ wt. parts | 3.0 | 3.0 | 3.0 | 3.0 | 3.0 | 3.0 | 3.0 | 3.0 | 3.0 |
| Feed rate of polymerization raw materials | kg/hr | 10.0 | 10.0 | 10.0 | 10.0 | 10.0 | 10.0 | 10.0 | 10.0 | 10.0 |
| Number or reaction tank(s) | tanks | 1 | 1 | 1 | 1 | 1 | 1 | 1 | 1 | 1 |
| Polymerization temperature (first reaction tank) | °C. | 135.0 | 135.0 | 135.0 | 135.0 | 135.0 | 135.0 | 135.0 | 135.0 | 144.0 |
| Polymerization temperature (second reaction tank) | °C. | — | — | — | — | — | — | — | — | — |
| Degree of polymerized conversion (first reaction tank) | wt % | 52.7 | 52.7 | 52.7 | 52.7 | 52.7 | 52.7 | 52.7 | 52.7 | 66.2 |
| Degree of polymerized conversion (second reaction tank) | wt % | — | — | — | — | — | — | — | — | — |
| Solid content of polymerization mixture (first reaction tank) | wt % | 45.0 | 45.0 | 45.0 | 45.0 | 45.0 | 45.0 | 45.0 | 45.0 | 55.0 |
| Solid content of polymerization mixture (second reaction tank) | wt % | — | — | — | — | — | — | — | — | — |
| Fluidity of resin (MFI) | g/10 min | 1.45 | 1.45 | 1.43 | 1.41 | 1.45 | 1.41 | 1.43 | 1.47 | 1.50 |
| Color difference (Lab system) | — | 9.42 | 8.24 | 6.35 | 8.52 | 7.36 | 8.17 | 9.14 | 7.53 | 7.93 |

TABLE 1-continued

| Item | Unit | Example 10 | 11 | 12 | 13 | 14 | 15 | 16 | 17 | 18 |
|---|---|---|---|---|---|---|---|---|---|---|
| Composition of polymerization raw materials | | | | | | | | | | |
| Styrene (ST) | wt. parts | 25.0 | 30.0 | 30.0 | 27.0 | 30.0 | 30.0 | 30.0 | 30.0 | 27.0 |
| Methyl methacrylate (MMA) | wt. parts | 49.0 | 36.0 | 36.0 | 48.0 | 36.0 | 36.0 | 36.0 | 36.0 | 48.0 |
| Ethyl acrylate (EA) | wt. parts | 0.0 | 9.0 | 9.0 | 0.0 | 9.0 | 9.0 | 9.0 | 9.0 | 0.0 |
| Rubbery polymer | wt. parts | 6.0 | 5.0 | 5.0 | 5.0 | 5.0 | 5.0 | 5.0 | 5.0 | 5.0 |
| Ethylbenzene | wt. parts | 20.0 | 20.0 | 20.0 | 20.0 | 20.0 | 20.0 | 20.0 | 20.0 | 20.0 |
| t-Dodecylmercaptane | × $10^{-2}$ wt. parts | 20.0 | 7.0 | 7.0 | 20.0 | 7.0 | 7.0 | 7.0 | 7.0 | 20.0 |
| Polymerization initiator | × $10^{-2}$ wt. parts | 3.0 | 3.0 | 3.0 | 3.0 | 3.0 | 3.0 | 3.0 | 3.0 | 3.0 |
| Feed rate of polymerization raw materials | kg/hr | 10.0 | 10.0 | 10.0 | 10.0 | 10.0 | 10.0 | 10.0 | 10.0 | 10.0 |
| Number of reaction tank(s) | tanks | 1 | 1 | 2 | 1 | 1 | 1 | 1 | 2 | 1 |
| Polymerization temperature (first reaction tank) | °C. | 122.0 | 137.0 | 110.0 | 141.0 | 137.0 | 126.0 | 137.0 | 110.0 | 141.0 |
| Polymerization temperature (second reaction tank) | °C. | — | — | 130.0 | — | — | — | — | 130.0 | — |
| Degree of polymerized conversion (first reaction tank) | wt % | 39.2 | 56.0 | 24.0 | 56.0 | 56.0 | 40.0 | 56.0 | 24.0 | 56.0 |
| Degree of polymerized conversion (second reaction tank) | wt % | — | — | 56.0 | — | — | — | — | 56.0 | — |
| Solid content of polymerization mixture (first reaction tank) | wt % | 35.0 | 47.0 | 23.0 | 47.0 | 47.0 | 35.0 | 47.0 | 23.0 | 47.0 |
| Solid content of polymerization mixture (second reaction tank) | wt % | — | — | 47.0 | — | — | — | — | 47.0 | — |
| Fluidity of resin (MFI) | g/10 min | 1.39 | 1.72 | 1.63 | 1.52 | 1.68 | 1.57 | 1.67 | 1.66 | 1.54 |
| Color difference (Lab system) | — | — | 9.64 | 4.65 | 4.32 | 1.69 | 4.51 | 5.16 | 15.56 | 16.35 | 12.85 |

| Item | Unit | Comparative Example 1 | 2 | 3 | 4 | 5 | 6 | 7 | 8 |
|---|---|---|---|---|---|---|---|---|---|
| Composition of polymerization raw materials | | | | | | | | | |
| Styrene (ST) | wt. parts | 25.0 | 25.0 | 25.0 | 14.0 | 38.0 | 19.0 | 25.0 | 30.0 |
| Methyl methacrylate (MMA) | wt. parts | 49.0 | 49.0 | 49.0 | 60.0 | 36.0 | 49.0 | 49.0 | 36.0 |
| Ethyl acrylate (EA) | wt. parts | 0.0 | 0.0 | 0.0 | 0.0 | 0.0 | 0.0 | 0.0 | 9.0 |
| Rubbery polymer | wt. parts | 6.0 | 6.0 | 6.0 | 6.0 | 6.0 | 6.0 | 6.0 | 5.0 |
| Ethylbenzene | wt. parts | 20.0 | 20.0 | 20.0 | 20.0 | 20.0 | 20.0 | 20.0 | 20.0 |
| t-Dodecylmercaptane | × $10^{-2}$ wt. parts | 20.0 | 20.0 | 20.0 | 20.0 | 20.0 | 20.0 | 20.0 | 7.0 |
| Polymerization initiator | × $10^{-2}$ wt. parts | 3.0 | 3.0 | 3.0 | 3.0 | 3.0 | 3.0 | 3.0 | 3.0 |
| Feed rate of polymerization raw materials | kg/hr | 10.0 | 10.0 | 10.0 | 10.0 | 10.0 | 10.0 | 10.0 | 10.0 |
| Number of reaction tank(s) | tanks | 1 | 1 | 1 | 1 | 1 | 1 | 1 | 1 |
| Polymerization temperature (first reaction tank) | °C. | 135.0 | 135.0 | 135.0 | 135.0 | 135.0 | 135.0 | 158.0 | 159.0 |
| Polymerization temperature (second reaction tank) | °C. | — | — | — | — | — | — | — | — |
| Degree of polymerized conversion (first reaction tank) | wt % | 52.7 | 52.7 | 52.7 | 52.7 | 52.7 | 52.7 | 79.7 | 80.0 |
| Degree of polymerized conversion (second reaction tank) | wt % | — | — | — | — | — | — | — | — |
| Solid content of polymerization mixture (first reaction tank) | wt % | 45.0 | 45.0 | 45.0 | 45.0 | 45.0 | 45.0 | 65.0 | 65.0 |
| Solid content of polymerization mixture (second reaction tank) | wt % | — | — | — | — | — | — | — | — |
| Fluidity of resin (MFI) | g/10 min | 1.38 | 1.37 | 1.35 | 1.45 | 1.45 | 1.42 | 1.56 | 1.95 |
| Color difference (Lab system) | — | 8.41 | 8.34 | 7.35 | 8.83 | 6.42 | 8.17 | 9.14 | 4.31 |

TABLE 2

| Item | Unit | Example | | | | | | | | |
|---|---|---|---|---|---|---|---|---|---|---|
| | | 1 | 2 | 3 | 4 | 5 | 6 | 7 | 8 | 9 |
| Content of styrene in rubbery polymer | wt % | 23.0 | 23.0 | 23.0 | 23.0 | 23.0 | 23.0 | 20.7 | 23.0 | 23.0 |
| Refractive index of rubbery polymer ($n_1$) | — | 1.5278 | 1.5278 | 1.5278 | 1.5278 | 1.5278 | 1.5278 | 1.5267 | 1.5278 | 1.5278 |
| Composition of styrene-alkyl(meth)acrylate copolymer | wt % | | | | | | | | | |
| Styrene | wt % | 37.0 | 37.0 | 37.0 | 37.0 | 37.0 | 37.0 | 37.0 | 46.0 | 36.5 |
| Methyl methacrylate | wt % | 63.0 | 63.0 | 63.0 | 63.0 | 63.0 | 63.0 | 63.0 | 54.0 | 63.5 |
| Ethyl acrylate | wt % | 0.0 | 0.0 | 0.0 | 0.0 | 0.0 | 0.0 | 0.0 | 0.0 | 0.0 |
| Refractive index of copolymer ($n_2$) | — | 1.5258 | 1.5258 | 1.5258 | 1.5258 | 1.5258 | 1.5258 | 1.5258 | 1.5358 | 1.5249 |
| $\mid n_1 - n_2 \mid$ | — | 0.0020 | 0.0020 | 0.0020 | 0.0020 | 0.0020 | 0.0020 | 0.0009 | 0.0080 | 0.0029 |
| Content of rubbery polymer in resin | wt % | 13.4 | 13.4 | 13.4 | 13.4 | 13.4 | 26.7 | 13.4 | 13.4 | 10.9 |
| Average particle size of rubbery polymer | μm | 0.80 | 0.88 | 1.10 | 1.96 | 1.17 | 1.50 | 1.12 | 0.77 | 1.73 |
| Particle size distribution index of rubbery polymer | — | 2.64 | 2.83 | 3.41 | 4.15 | 3.58 | 4.37 | 3.06 | 2.94 | 4.98 |
| Transparency | | | | | | | | | | |
| Whole light transmittance | % | 94.0 | 94.1 | 92.0 | 85.6 | 92.1 | 91.2 | 92.4 | 86.6 | 90.9 |
| Haze | % | 10.1 | 10.9 | 13.1 | 18.9 | 13.3 | 17.4 | 13.5 | 17.2 | 15.7 |
| Change in transparency upon forming (H/h) | — | 4.13 | 4.57 | 6.34 | 7.53 | 5.52 | 7.62 | 5.53 | 4.55 | 6.94 |
| Izod impact strength | kg·cm/cm | 11.2 | 13.1 | 14.3 | 9.5 | 15.2 | 18.4 | 14.3 | 10.9 | 16.8 |
| Practical impact strength | | | | | | | | | | |
| Position S (before heating) | kg·cm | 55 | 63 | 68 | 41 | 75 | 93 | 69 | 53 | 74 |
| Position S (after heated) | kg·cm | 30 | 35 | 38 | 20 | 40 | 45 | 32 | 29 | 32 |
| Position T (before heating) | kg·cm | 68 | 74 | 77 | 57 | 93 | 96 | 80 | 69 | 81 |
| Position T (after heated) | kg·cm | 37 | 37 | 41 | 25 | 49 | 49 | 39 | 37 | 37 |
| Position U (before heating) | kg·cm | 85 | 92 | 93 | 76 | 106 | 103 | 93 | 83 | 88 |
| Position U (after heated) | kg·cm | 43 | 46 | 53 | 31 | 58 | 58 | 55 | 43 | 42 |

| Item | Unit | Example | | | | | | | | |
|---|---|---|---|---|---|---|---|---|---|---|
| | | 10 | 11 | 12 | 13 | 14 | 15 | 16 | 17 | 18 |
| Content of styrene in rubbery polymer | wt % | 23.0 | 25.0 | 25.0 | 25.0 | 25.0 | 25.0 | 25.0 | 25.0 | 25.0 |
| Refractive index of rubbery polymer ($n_1$) | — | 1.5278 | 1.5296 | 1.5296 | 1.5296 | 1.5296 | 1.5296 | 1.5296 | 1.5296 | 1.5296 |
| Composition of styrene-alkyl(meth)acrylate copolymer | | | | | | | | | | |
| Styrene | wt % | 37.6 | 38.3 | 38.4 | 38.0 | 38.3 | 38.6 | 38.3 | 38.4 | 38.0 |
| Methyl methacrylate | wt % | 63.4 | 51.5 | 51.2 | 62.0 | 51.5 | 51.4 | 51.5 | 51.2 | 62.0 |
| Ethyl acrylate | wt % | 0.0 | 10.2 | 10.4 | 0.0 | 10.2 | 10.0 | 10.2 | 10.4 | 0.0 |
| Refractive index of copolymer ($n_2$) | — | 1.5266 | 1.5253 | 1.5255 | 1.5271 | 1.5253 | 1.5260 | 1.5255 | 1.5253 | 1.5270 |
| $\mid n_1 - n_2 \mid$ | — | 0.0012 | 0.0043 | 0.0041 | 0.0025 | 0.0043 | 0.0036 | 0.0041 | 0.0043 | 0.0026 |
| Content of rubbery polymer in resin | wt % | 17.1 | 10.6 | 10.6 | 10.6 | 10.6 | 14.3 | 10.6 | 10.6 | 10.6 |
| Average particle size of rubbery polymer | μm | 0.61 | 0.56 | 0.61 | 0.72 | 0.57 | 0.54 | 0.58 | 0.58 | 0.67 |
| Particle size distribution index of rubbery polymer | — | 2.34 | 2.57 | 3.03 | 2.61 | 2.78 | 2.63 | 5.26 | 3.14 | 2.87 |
| Transparency | | | | | | | | | | |
| Whole light transmittance | % | 95.3 | 96.7 | 93.6 | 95.2 | 96.1 | 96.2 | 94.5 | 91.8 | 92.1 |
| Haze | % | 9.7 | 5.6 | 10.8 | 8.5 | 5.9 | 5.7 | 9.2 | 14.9 | 11.2 |
| Change in transparency upon forming (H/h) | — | 3.79 | 1.41 | 3.24 | 5.20 | 1.52 | 1.63 | 7.85 | 7.76 | 9.93 |
| Izod impact strength | kg·cm/cm | 16.3 | 9.5 | 12.6 | 10.6 | 8.8 | 10.7 | 7.3 | 10.4 | 8.3 |
| Practical impact strength | | | | | | | | | | |
| Position S (before heating) | kg·cm | 81 | 77 | 85 | 52 | 68 | 79 | 61 | 84 | 48 |
| Position S (after heated) | kg·cm | 37 | 58 | 78 | 45 | 53 | 60 | 36 | 47 | 30 |
| Position T (before heating) | kg·cm | 93 | 93 | 112 | 75 | 89 | 93 | 82 | 101 | 66 |
| Position T (after heated) | kg·cm | 44 | 78 | 107 | 61 | 75 | 79 | 43 | 51 | 38 |
| Position U (before heating) | kg·cm | 95 | 98 | 127 | 85 | 97 | 101 | 93 | 116 | 78 |
| Position U (after heated) | kg·cm | 51 | 77 | 120 | 72 | 79 | 81 | 58 | 68 | 56 |

TABLE 2-continued

|  |  | Comparative Example | | | | | | | |
| --- | --- | --- | --- | --- | --- | --- | --- | --- | --- |
| Item | Unit | 1 | 2 | 3 | 4 | 5 | 6 | 7 | 8 |
| Content of styrene in rubbery polymer | wt % | 23.0 | 21.0 | 11.5 | 23.0 | 23.0 | 23.0 | 23.0 | 25.0 |
| Refractive index of rubbery polymer ($n_1$) | — | 1.5278 | 1.5268 | 1.5226 | 1.5278 | 1.5278 | 1.5278 | 1.5278 | 1.5296 |
| Composition of styrene-alkyl(meth)acrylate polymer | | | | | | | | | |
| Styrene | wt % | 37.0 | 37.0 | 37.0 | 20.6 | 51.0 | 28.5 | 35.9 | 37.0 |
| Methyl methacrylate | wt % | 63.0 | 63.0 | 63.0 | 79.4 | 49.0 | 71.5 | 64.1 | 52.7 |
| Ethyl acrylate | wt % | 0.0 | 0.0 | 0.0 | 0.0 | 0.0 | 0.0 | 0.0 | 10.3 |
| Refractive index of copolymer ($n_2$) | — | 1.5258 | 1.5258 | 1.5258 | 1.5094 | 1.5400 | 1.5158 | 1.5233 | 1.5231 |
| $|n_1-n_2|$ | — | 0.0020 | 0.0010 | 0.0032 | 0.0184 | 0.0122 | 0.0120 | 0.0045 | 0.0065 |
| Content of rubbery polymer in resin | wt % | 13.4 | 13.4 | 13.4 | 13.4 | 13.4 | 13.4 | 9.2 | 7.7 |
| Average particle size of rubbery polymer | μm | 7.15 | 3.20 | 3.60 | 0.83 | 0.75 | 0.83 | 6.02 | 3.98 |
| Particle size distribution index of rubbery polymer | — | 7.53 | 7.86 | 5.12 | 4.56 | 3.39 | 4.37 | 9.86 | 8.45 |
| Transparency | | | | | | | | | |
| Whole light transmittance | % | 68.8 | 71.0 | 70.5 | 47.2 | 56.3 | 55.1 | 69.3 | 67.0 |
| Haze | % | 41.2 | 42.3 | 50.2 | 80.1 | 73.1 | 70.6 | 48.5 | 54.2 |
| Change in transparency upon forming (H/h) | — | 11.46 | 9.56 | 8.70 | 5.15 | 6.27 | 5.82 | 10.31 | 8.56 |
| Izod impact strength | kg · cm/cm | 3.9 | 4.2 | 4.1 | 11.1 | 10.7 | 10.5 | 3.3 | 5.0 |
| Practical impact strength | | | | | | | | | |
| Position S (before heating) | kg · cm | 18 | 9 | 8 | 53 | 53 | 55 | 8 | 51 |
| Position S (after heated) | kg · cm | 8 | 4 | 3 | 27 | 26 | 25 | 4 | 42 |
| Position T (before heating) | kg · cm | 23 | 14 | 12 | 68 | 70 | 72 | 15 | 78 |
| Position T (after heated) | kg · cm | 12 | 6 | 5 | 33 | 35 | 35 | 6 | 61 |
| Position U (before heating) | kg · cm | 45 | 15 | 15 | 86 | 82 | 84 | 17 | 85 |
| Position U (after heated) | kg · cm | 20 | 7 | 6 | 41 | 40 | 42 | 7 | 72 |

We claim:

1. A transparent, rubber-modified styrene resin comprising:
   (1) 70 to 96 parts by weight of a copolymer (A) formed of 20 to 70 wt. % of styrene monomer units and 30 to 80 wt. % of alkyl (meth)acrylate monomer units, and
   (2) 4 to 30 parts by weight of a rubbery polymer (B), said rubbery polymer being dispersed in said copolymer (A) as particles having an average particle size of 0.1 to 2.0 μm, at least 70 wt. % of said rubbery polymer being a styrene-butadiene block copolymer (B1) which is formed of 5 to 40 wt. % of styrene units and 60 to 95 wt. % of butadiene units, has a viscosity in a range of 3 to 40 cps when measured as a 5 wt. % styrene solution at 25° C. and possesses a ratio (Mw/Mn) of a weight average molecular weight (Mw) to a number average molecular weight (Mn) in a range of 1.0 to 1.5,
   wherein said copolymer (A) and said rubbery polymer (B) have substantially the same refractive index.

2. The resin of claim 1, wherein said styrene-butadiene block copolymer (B1) contains 1,2-vinyl bonds in a proportion of 1.0 to 13.8 wt. % based on unsaturated bonds derived from butadiene; and wherein the dispersed particles of the rubbery polymer have a particle size distribution index of 2.0 to 5.0.

3. A process for the production of a transparent, rubber-modified styrene resin, which comprises:
   continuously charging into a polymerizer polymerization raw materials composed primarily of (B) a rubbery polymer, a styrene monomer and an alkyl (meth)acrylate, said rubbery polymer (B) comprising at least 70 wt. % of (B-1) a rubbery polymer which is a styrene-butadiene block copolymer formed of 5 to 40 wt. % of styrene units and 60 to 95 wt. % of butadiene units, has a viscosity of 3 to 40 cps when measured as a 5 wt. % styrene solution at 25° C. and possesses a ratio (Mw/Mn) of a weight average molecular weight (Mw) to a number average molecular weight (Mn) in a range of 1.0 to 1.5;
   polymerizing the raw materials at a polymerization temperature of 80° to 160° C. under continuous stirring of the resulting polymerization mixture to form (A) a copolymer of the styrene monomer and the alkyl (meth)acrylate having a refractive index substantially the same as the rubbery polymer (B), and under the condition that the solid content of the polymerization mixture is not higher than 60 wt. %, causing the copolymer (A) and the rubbery polymer (B) to transform into a continuous phase and a dispersed phase, respectively, so that the rubbery polymer (B) is formed into dispersed particles having an average particle size of 0.2 to 2.0 μm; and
   feeding the polymerization mixture into a volatile elimination unit to eliminate any unreacted monomers from the polymerization mixture.

4. The process of claim 3, wherein the solid content of the polymerization mixture upon causing the copolymer (A) and the rubbery polymer (B) to transform into the continuous phase and the dispersed phase, respectively, is 30 to 60 wt. %.

5. The process of claim 3, wherein said styrene-butadiene block copolymer (B1) contains 1,2 vinyl bonds in proportion of 1.0 to 13.8 wt. % based on unsaturated bonds derived from butadiene.

6. The process of claim 3, wherein said styrene-butadiene block copolymer (B1) contains 1,2-vinyl bonds in a proportion of 1.0 to 13.8 wt. % based on unsaturated bonds derived from butadiene; the rubbery polymer (B) in said polymerization raw materials is caused to transform into a depersed phase to have a particle size distribution index of 2.0 to 5.0; and the elimination of any unreacted monomers from the polymerization mixture is conducted while controlling the solid content of the polymerization mixture at 75 wt. % or lower.

7. The process of claim 3, wherein said polymerization is conducted by the bulk polymerization process or the continuous solution polymerization process.

8. The process of claim 3, wherein the absolute value of a difference in refractive index between the rubbery polymer (B) and the copolymer (A) is not greater than 0.01.

9. The process of claim 3, wherein the styrene monomer is styrene, and the alkyl (meth)acrylate monomer is at least one ester selected from the group consisting of methyl methacrylate, methyl acrylate and ethyl acrylate.

10. The process of claim 4, wherein the styrene-butadiene copolymer (B-1) has a viscosity of 3 to 30 cps when measured as a 5 wt. % styrene solution at 25° C.

11. The process of claim 3, wherein the concentration of the rubbery polymer (B) in the polymerization raw materials is 2 to 12 wt. %, and the concentration of the rubbery polymer (B) in the produced resin is 4 to 30 wt. %.

12. The process of claim 4, wherein the polymerizer comprises a single complete-mixing polymerization tank.

13. The process of claim 4, wherein the styrene monomer is styrene and the alkyl (meth)acrylate is methyl methacrylate.

14. The process of claim 3, wherein an organic peroxide is used in an amount of 0.001 to 5.0 parts by weight per 100 parts by weight of the sum of the styrene monomer and the alkyl (meth)acrylate.

15. The process of claim 3, wherein the rubbery polymer is transformed into dispersed particles under the condition that the solid content of the polymerization mixture is not higher than 50 wt. %, and the unreacted monomers are removed from the polymerization mixture under the condition that the solid content of the polymerization mixture is not higher than 60 wt. %.

* * * * *